United States Patent [19]
Ballu

[11] Patent Number: 4,592,164
[45] Date of Patent: Jun. 3, 1986

[54] HERBICIDE APPLICATOR
[75] Inventor: Patrick J. M. Ballu, Reims, France
[73] Assignee: Tecnoma, France
[21] Appl. No.: 438,739
[22] Filed: Nov. 3, 1982
[30] Foreign Application Priority Data
  Nov. 4, 1981 [FR] France ................ 81 20653
[51] Int. Cl.$^4$ ............................ A01G 13/00
[52] U.S. Cl. ................................ 47/1.5; 47/1.7
[58] Field of Search .......... 47/1.5, 1.7, 60, 62; 403/53, 62; 56/10.4; 285/185; 220/82 R

[56] References Cited
U.S. PATENT DOCUMENTS

| | | | |
|---|---|---|---|
| 1,527,669 | 12/1923 | Camp | 47/1.5 |
| 1,764,952 | 6/1930 | Hay | 47/1.5 |
| 2,223,809 | 12/1940 | Rucker | 47/1.5 |
| 2,311,782 | 2/1943 | Segars | 47/1.5 |
| 3,002,319 | 10/1961 | Laughlin | 47/1.5 |
| 3,021,642 | 2/1962 | Ewing | 47/1.5 |
| 4,377,920 | 3/1983 | Bowman | 47/1.5 |

Primary Examiner—Robert A. Hafer
Assistant Examiner—Bradley M. Lewis
Attorney, Agent, or Firm—Darby & Darby

[57] ABSTRACT

This invention relates to a mobile device for applying a weed-killer between rows of cultivated plants, e.g. vine stocks. This applicator has a moistening contact action, as distinguished from spraying. It comprises at least one tubular container, the axis of which is horizontal during use, with flexible wicks extending outside of this tube for applying a weed-killer to the weeds.

The main feature of this applicator is that the wicks are in the shape of flat braids laying side-by-side so as to form a single continuous sheet, ensuring a uniform distribution of the product over the treated area.

One embodiment of the invention is a tractor-mounted device in which two swivelling arms extending right and left of a median frame carry the applicator devices. These arms are resiliently biased outwardly and may fold inwards when meeting an obstacle such as a vine stock, and spread out again after clearing the obstacle.

The device may be provided with means for intermittently pressure-feeding metered amounts of concentrated liquid to the wicks, either through the container in which the wicks are inserted, or else through nozzles spraying liquid onto the wicks.

The device is also suitable for applying growth-regulators or other chemical agents in small metered amounts, uniformly distributed with a moistening contact action.

16 Claims, 19 Drawing Figures

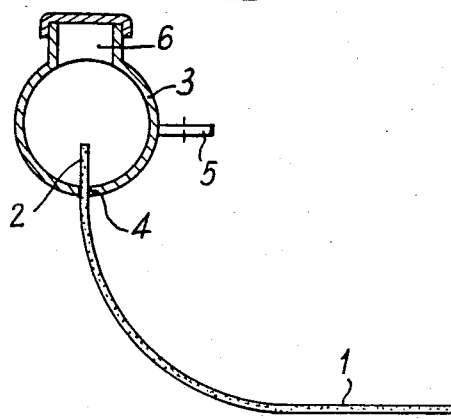
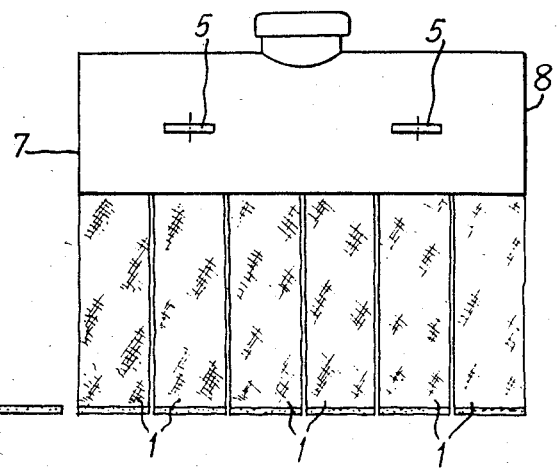
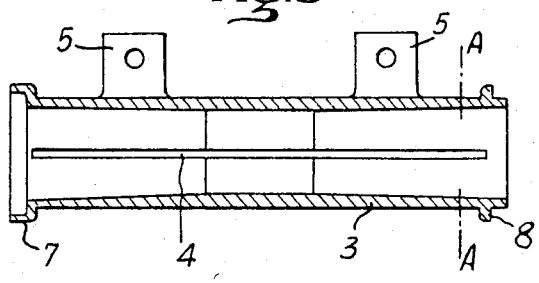
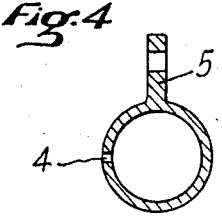
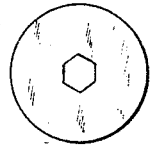
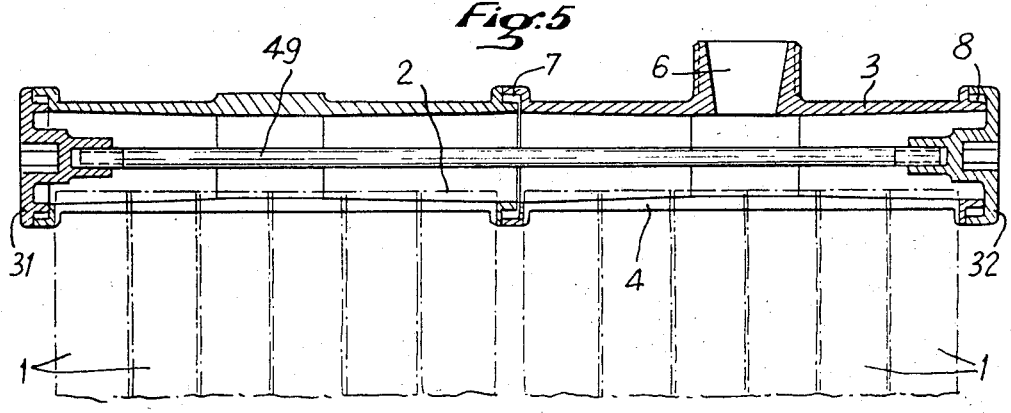

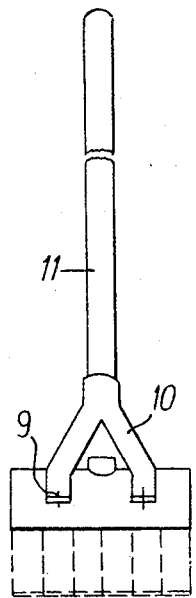
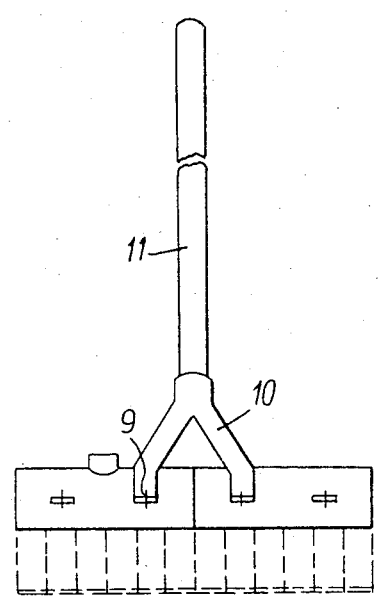
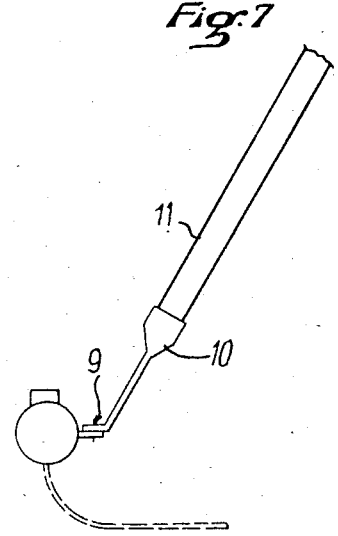
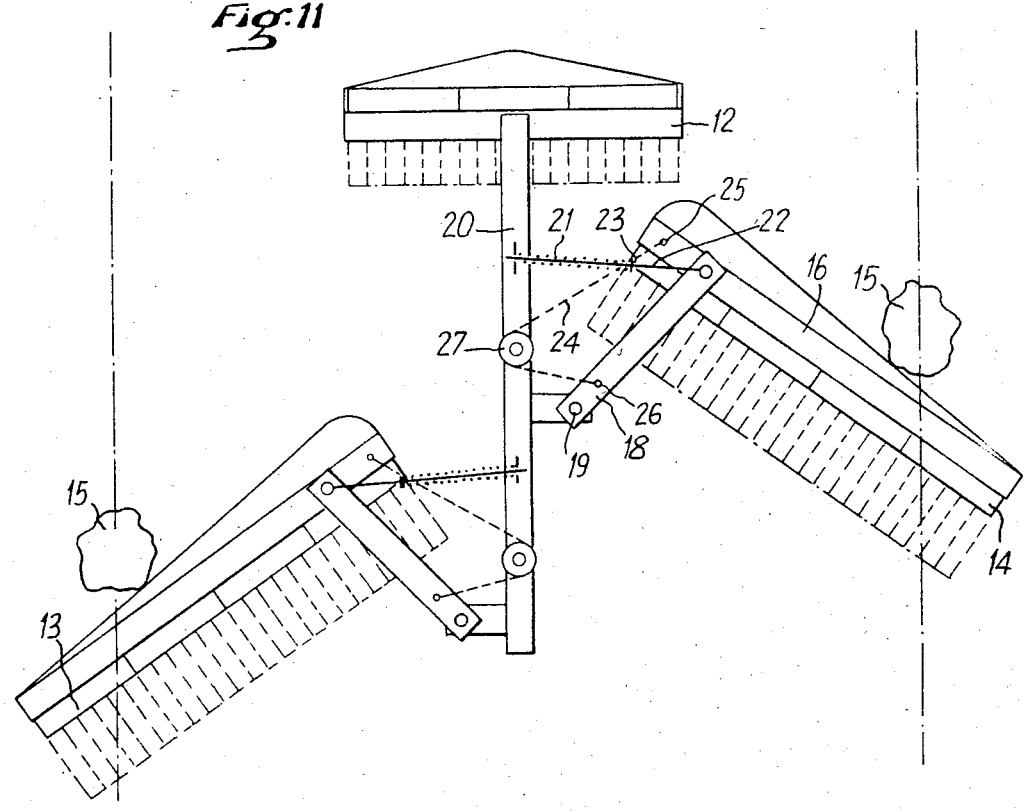

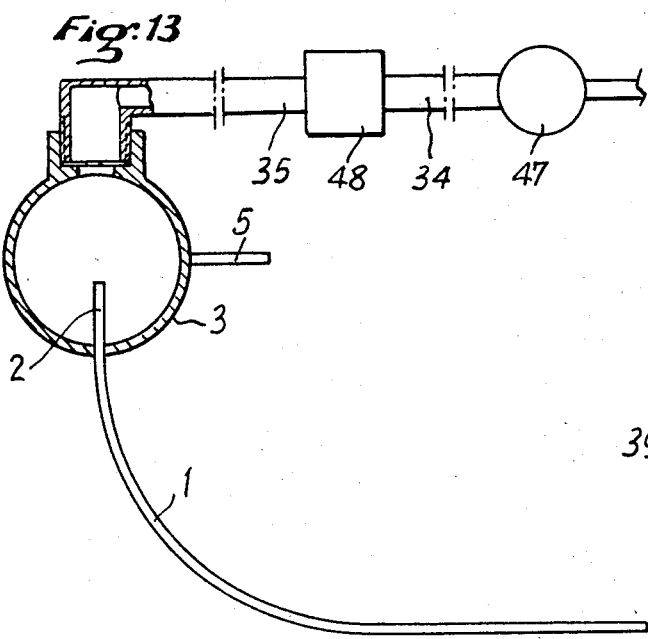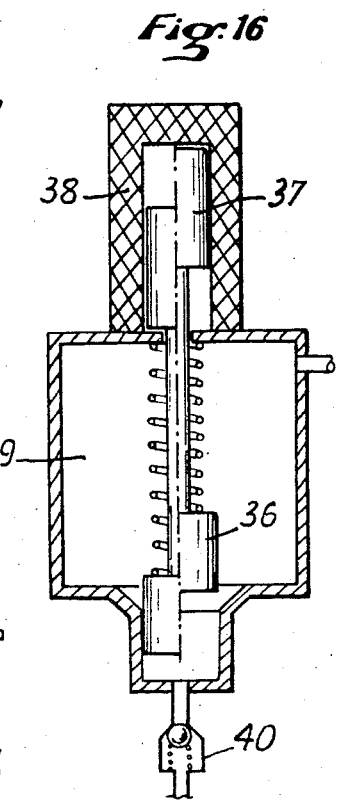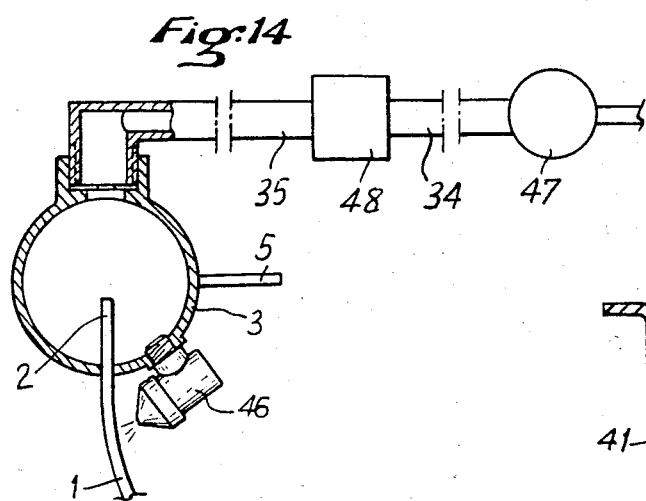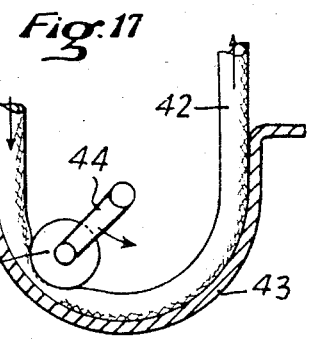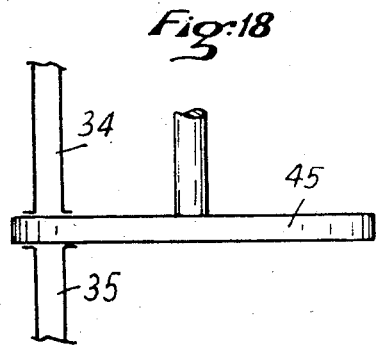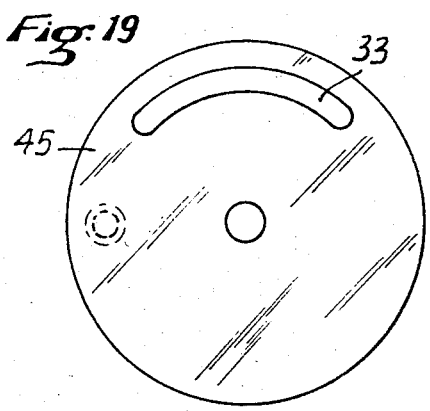

HERBICIDE APPLICATOR

This invention relates to a device for applying chemical agents, such as weed-killers or growth-regulators, to cultivated fields. This device may be hand-held or carried by a tractor, and has a moistening contact action, as distinguished from spraying. One important feature lies in the possibility to use only a small volume of a concentrated chemical agent, so that, for a given acreage to be treated, much less water will be used and a much smaller volume of liquid will need to be transported.

BACKGROUND OF THE INVENTION

It has already been proposed, for achieving a moistening contact, to use rotary brushes provided with irrigated bristles having a cruciform cross-section. However, these bristles wear out and tear off very quickly.

Another proposal (U.S. Pat. No. 1,764,152) consists in using long flexible wicks, one end of which is held in a horizontal tubular container. However, this arrangement does not provide the possibility to sweep the ground in a sheet, since the wicks are formed of separate strands passing through spaced-out openings of the container.

SUMMARY OF THE INVENTION

This invention relates to a device for applying chemical agents, such as herbicides (i.e. weed-killers) and growth-regulating agents, in a continuous layer, while avoiding the drawbacks of the above-mentioned prior devices. This device may be hand-held or carried by a tractor or some other agricultural implement, and makes it possible to use only a small volume of a concentrated chemical agent so that, for a given acreage to be treated, much less water will be used and a much smaller volume of liquid will need to be transported.

The main feature of the device according to this invention is that it comprises a plurality of flat flexible wicks having capillary properties, laying side-by-side so as to form a continuous sheet, one end of which is fastened in a liquid-tight arrangement into a liquid-tight container holding the treating agent, so that these wicks are moistened with this agent through a capillary effect. The length of the wicks is such that, when this container is moved along the ground at a small distance thereof, the elongated portions of the wicks extending out of the container lie upon the vegetation under the effect of gravity, so that these wicks lap against the vegetation and moisten it with the product. This provides for an effective treatment, using only a small amount of product.

The number of wicks, their positioning and their dimensions make it possible to adapt the device to the various types of surfaces to be treated.

Further features of the invention comprise the following arrangements:

(a) The liquid container is in the form of a tube section, the axis of which is horizontal when the device is being used, and the wicks are laid side-by-side into at least one slot extending lengthwise along a generatrix of this tubular container.

(b) The ends of a tubular container are provided with means for joining this container in a liquid-tight interlocking assembly with another similar container, and stoppers are provided for being adapted to said tube ends, so that a varying number of containers may be assembled together for modifying the width of the applicator device.

(c) The tubular container forms the carrier element of the device and it is provided with lateral fixation lugs for adapting this container to any appropriate carrying structure.

(d) The liquid-tight insertion of the wicks into the tubular container is achieved in the course of the fabrication of the tube by means of injected material or by an overlay around the wicks.

Further features of the invention have the purpose of achieving a highly precise control of the liquid flow, this being an essential requirement when a concentrated chemical agent is being used. This precise control is made difficult by the fact that the liquid flow should remain very small (in the range of 10 to 30 milliliters per minute), and also by the fact that, in the course of manufacturing, some wicks are more tightly gripped into the tube slot than some others.

Therefore, the applicator according to this invention is further characterized by the following features:

(e) The tubular container may be fed intermittently with pressurized liquid, for instance by means of a pump associated with a mechanical or electro-mechanical metering device, or by means of a metering pump or any other equivalent means.

(f) Spray nozzles, also fed in the same intermittent way with pressurized liquid, are provided for spraying liquid onto the external portions of the wicks.

(g) The intermittent liquid flow is made proportional to the forward movement rate of the device, the pressurized liquid feeder means being driven by a mobile member at a rate proportional to said forward movement rate.

When the device is intended to be hand-held, the lateral lugs of at least one container may be fastened to a support provided with a shaft or some other form of handle for manual carrying.

The device may otherwise be adapted to a tractor by assembling one or several tubular containers with a structure carried by the tractor.

(h) According to a preferred embodiment of such a tractor-mounted device, the carrier structure comprises a first set of fixed members perpendicular to the axis of said structure, and further sets of swivelling members extending on either side of said axis towards the rear of said structure, said swivelling members being rotatable about a plurality of rotation axes and being biased outwardly by resilient means against which they may fold back in a retracted position alongside the carrier structure whenever they hit an obstacle, and return to their outwardly extended position after clearing the obstacle, through a combination of several mutually controlled pivotal motions.

(i) One swivelling lateral member is rotatably linked in the vicinity of its end close to the axis with a connecting rod, the other end of which is pivotally attached to the carrier structure, said connecting rod supporting the swivelling assembly being biased away from the structure by a spring or equivalent means, a rope or cable being provided for linking said other end of the connecting rod with the inward end of the swivelling member being closer to the axis, said rope passing over a pulley mounted on said structure.

The invention will now be described in further detail with reference to the appended drawings in which:

FIGS. 1 and 2 are diagrammatic views, respectively in cross-section and elevation, of the device according to the invention;

FIGS. 3 and 4 show, in axial horizontal cross-section and in cross section along A—A of FIG. 3, one embodiment of the container of FIGS. 1 and 2;

FIGS. 5 and 6 show an axial vertical cross-section and an end view of an embodiment of a container formed of several tubular sections as shown in FIGS. 3 and 4;

FIGS. 7 to 9 are diagrammatic views of a manual device, in partial cross-section and in elevation;

FIG. 11 is a view similar to FIG. 10, showing the swivelling elements in their stretched-out position;

FIG. 13 shows the device of FIG. 1, with an intermittent feed of pressurized liquid;

FIGS. 14 and 15 show modifications of FIG. 1;

FIG. 16 shows a metering pump for feeding the device of FIGS. 13 to 15;

FIG. 17 shows a peristaltic pump for feeding the device of FIGS. 13 or 14;

FIGS. 18 and 19 show a mechanical metering device for intermittent liquid feed.

DETAILED DESCRIPTION OF THE INVENTION

Figure 10:
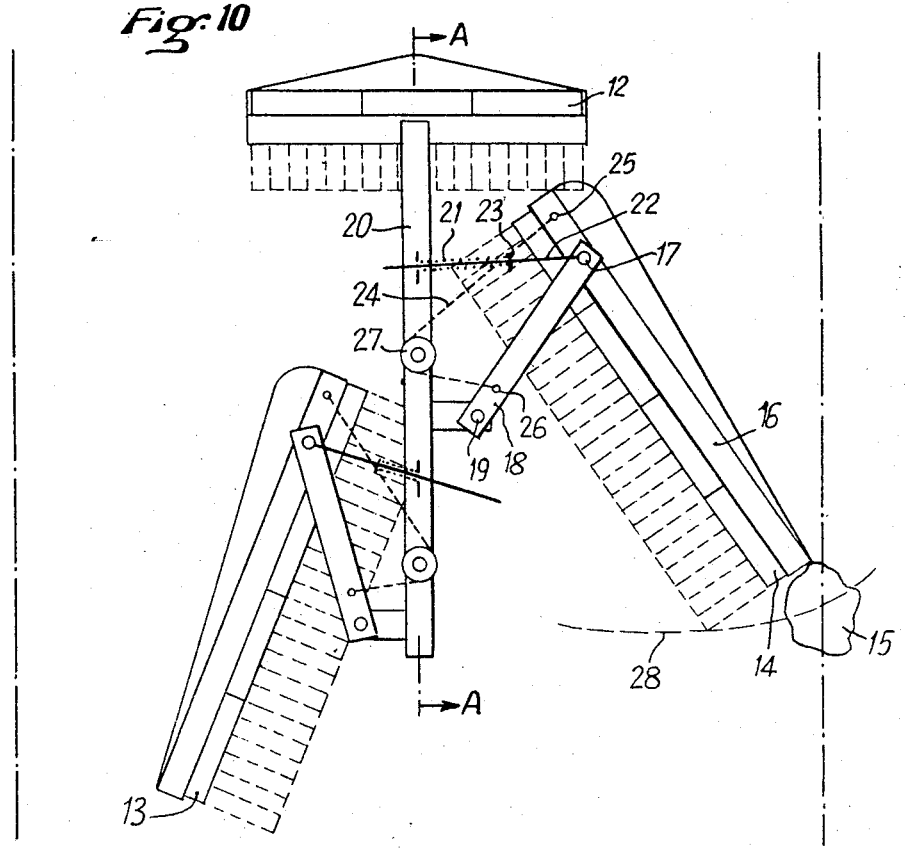
FIG. 10 is a diagrammatic plan view of a tractor-driven device comprising several swivelling elements, one of them on the left side being retracted and another one, on the right side, in the course of moving back.

Referring to FIGS. 1 and 2, the applicator device according to the invention comprises, as its main characteristic part, flexible flat wicks 1 laying in a row side-by-side, one of their ends 2 being held tightly, in a liquid-tight fashion, in a slot 4 of a container 3 provided for containing the liquid herbicide. The wicks 1 are made of a strong capillary material in the form of a braid or woven fibers. According to a different embodiment, both ends may be folded upon each other and held together in the container 3. The folded-over wick assembly will then have the shape of a two-layer flat wick, one end of which is held in the container and the other one has the shape of a flattened loop. This embodiment reduces fraying of the wick tips.

According to the invention, wicks 1 should be flat, flexible, capillary and wear-resistant. Their flexibility allows the free ends to rest upon the ground or upon the vegetation, as shown by FIG. 1, so that when the device is moved along, they brush very lightly upon the weeds, with only a slight friction, depositing upon these the liquid with which they are impregnated through capillarity. Since they are flat and arranged side-by-side (FIG. 2), they form a continuous curtain or sheet spreading continuously over the vegetation, closely following the irregular contour of the ground, without risking to cling to it.

Experience has shown that this arrangement provides for an effective moistening of the weeds, with a very small consumption of liquid and very little wear of the wicks.

Preferably, the width of the wicks should be rather small, relatively to their length, and their length should be sufficient, taking into account the design height of container 3 above the ground, for the wicks to rest upon the weeds along one third or one half of their length.

This extent of flexible contact is indeed a condition for a proper operation of the device of the invention.

A length comprised between about 10 and 30 centimeters (4 to 12") for the external part of the wicks will be suitable in most cases.

The container 3 will preferably have the shape of a horizontal tube section, with closed ends, and will be provided with a filling mouth 6 which may form an assembling member for supporting the container. This container may also be provided with lateral fixation lugs 5. The wicks 1 are aligned along at least one generatrix of the tube 3 and held tightly in at least one longitudinal slot 4.

According to a different embodiment, several rows of wicks 1 may be respectively inserted into several parallel slots 4.

FIGS. 3 to 6 show a preferred embodiment of the invention in which tubes 3 have open ends 7, 8 provided with means for joining several tube sections end-to-end in liquid-tight manner, as as to form a single container with several assembled sections. This arrangement gives a great flexibility to the device. Plugs 31, 32 are provided for being fitted in an impervious manner to the ends of a tube or of an assembly of several such tubes 3.

In the example shown, an internal rod 49 with threaded ends mates with plugs 31, 32 for achieving a liquid-tight fastening of the tubes and plugs, the plugs being provided with tightening means such as a bolt or a hex socket.

This arrangement makes it possible to adapt the width of the device to the spacing of the plant rows and is thus a very advantageous feature.

Tubes 3, as well as the plugs adaptable to tube ends 7, 8, may be made of a transparent or translucent material for making the liquid level readily visible.

Preferably, tubes 3 will be made of an injection-moulded plastic material, so that fixation lugs, slots for inserting the wicks and junction means can be formed in one single operation.

The device of the invention may be designed as a manual apparatus or for being mounted on a tractor.

FIGS. 7, 8 and 9 show an embodiment of a manual apparatus. This device comprises a container tube 3 attached through lugs 5 and bolts 9 to a supporting member 10 provided with a shaft 11 or any other prehension means, such as handles, etc . . . .

As shown by FIG. 9, the device may comprise several tube sections, assembled end-to-end. The spacing between two lugs 5 on any tube section will then be twice the spacing from one lug to the adjacent tube end, so that the same support 10 may be used for holding one tube or an assembly of two tubes.

A stand, not shown, may be adapted to each end of tube 3 for helping this tube to be dragged along effortlessly at a correct distance above the ground.

Figure 12:
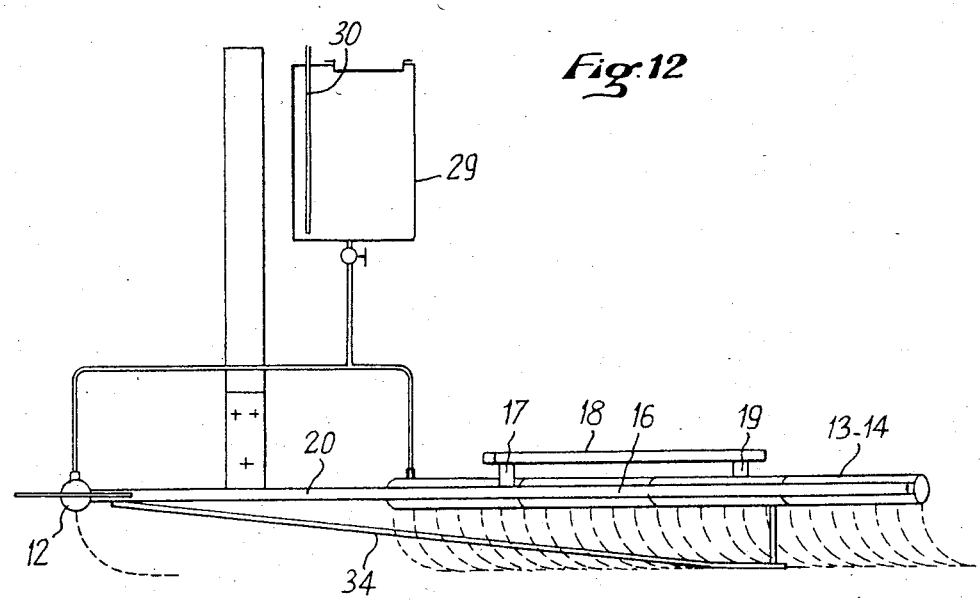
FIG. 12 shows a cross-section of the device of FIGS. 10 and 11, taken along A—A of FIG. 10.

FIGS. 10 to 12 show an example of a device designed for being tractor-mounted.

This device comprises several assemblies of elements mounted on a supporting structure such as frame 20, each element comprising one or several tubes 3.

A first assembly 12 is rigidly mounted across the centerline of frame 20, so as to move in the central zone between two rows of plants 5 to which the weed-killing treatment will be applied.

On either side of this centerline are mounted two swivelling assemblies 13, 14, each one being pivotally mounted about several axes of rotation, so that the treatment may extend all the way up to the plant rows while providing for a quick withdrawal of these assemblies whenever they come up against a plant 15. This withdrawal is achieved by a combination of several mutually controlled rotary motions, while the assembly will be returned to its initial position by resilient means as soon as it will have cleared this plant or stock 15, so that the product may be deposited all over the ground surface.

Various mechanical means may be adopted for this setup of several combined swivel motions, with resilient return means.

In the example shown, each swivelling assembly 13, 14 comprises a support arm 16 swivelling about an axis 17 located near the inward tip of this arm. To this same axis 17 is attached one end of a connecting rod 18, the other end 19 of which swivels about a trunnion fixed to central frame 20. A spring 21 or an equivalent means continuously pushes the distal end 17 of rod 18 away from the centerline. This spring 21 is guided by a stem 22 and compressed between frame 20 and a stop washer 23 on stem 22.

The support arm 16 is further positioned relatively to connecting rod 18 by a rope or cable 24, one end of which is attached to a lug 25 on arm 16, close to the inward tip of said arm, the other end of this rope being attached to a lug 26 on connecting rod 18, while this rope rolls around a pulley 27 mounted on the central frame 20.

The initial position of arms 16 is preferably slightly slanting towards the rear of the device relatively to a perpendicular to the centerline of frame 20.

When an arm 16 meets a plant such as a vine stock 15, its initial slant relative to the sense of forward motion will facilitate its withdrawal towards the central frame.

As the arm 16 swivels about pivot 17, this arm pulls rope 24 which in turn pulls the connecting rod 18 towards the central frame 20. This motion brings the pivot 17 closer to the frame 20 so that the arm 16 folds back, with a quick motion, to a position almost parallel to the centerline (as shown by dotted arcuate line 28) while providing for a complete coverage of the ground when the arm 16 is extended outwardly.

FIG. 11 shows arms 16 fully extended, as a function of a given spacing between plant rows.

FIG. 10 shows, on its left side, a completely retracted arm, and on its right side, the motion of arm 16 when contacting a vine stock 15.

FIG. 12 shows how frame 20 may advantageously be provided with a runner 34 resting upon the ground so as to maintain elements 12, 13 and 14 at a predetermined spacing above the ground.

The utilization range of the device depends upon the capacity of containers 3. It may be increased by providing the device with a tank 29 for feeding elements 12, 13, 14 through any suitable piping system.

The tractor-mounted device shown in these figures is obviously just an example of an embodiment of the invention, which may take different forms or use other means. For instance, the spring 21 may be substituted with any other resilient return device, and the swivel arm arrangement may have a different geometry, as long as there are provided several swivelling motions which control each other mutually so that the swivel arms may fold inward in a quick motion.

FIGS. 13 to 19 show various means for achieving a rigorous control of liquid flow along the wicks 1. This flow must indeed be very small (from 10 to 30 milliliters per minute), whereas the insertion of wicks 1 into the tubular containers 3 with a plastic overlay makes it difficult to achieve, in industrial production, a closely controlled flow when resorting solely to gravity and capillarity.

The invention therefore provides for an intermittent pressurized feed of tubes 3 by means of a pump 47 associated with a distributor 48.

FIG. 13 shows how such an intermittent pressurized feed is applied to the tube assembly 13, thus forcing liquid out through slots 4, subsequent flow along wicks 1 taking place through capillarity.

Figure 15:
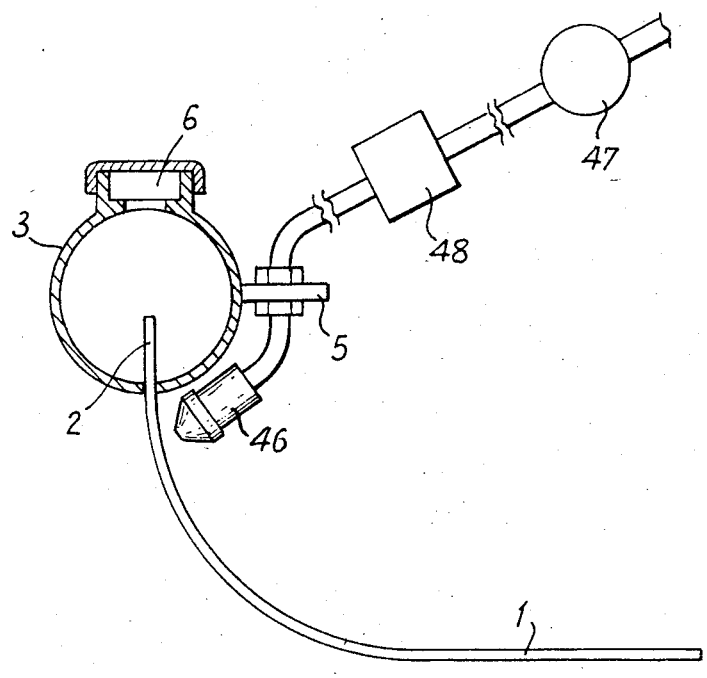

FIGS. 14 and 15 show spray nozzles 46 distributed across the width of a wick 1, with a spacing of about 150 mm, for instance, for an even distribution of liquid, these nozzles being fed by the pump-distributor assembly 47, 48, either directly (FIG. 15) or through the tubular container 3 (FIG. 14).

In the example shown, the spray nozzles are mounted on containers 3 so as to spray liquid on the portion of a wick extending outside of the container 3. The flow controlled by the pumping assembly 47, 48 is divided between a flow across slots 4 and a flow through the nozzles 46, the sum of these two flows remaining constant. As a limit, the flow may be entirely provided by nozzles 46, and tube 3 will then only serve as a support for the wicks.

Pump 47 may be of any suitable type and may be driven by a motor of any kind, electric, thermal, pneumatic or hydraulic, or again driven by a power take-off from the tractor or from a wheel of the applicator device or of the tractor.

Distributor 48 may consist of a solenoid valve energized with adjustable sequential pulses, or else of a mechanical device such as shown by FIGS. 18 and 19. These devices are known per se and need no detailed description.

FIGS. 18 and 19 show a distributor device comprising a rotary disk 45 provided with an arcuate slot 33 forming, at each turn, a communication from feed channel 34 to delivery channel 35 during a predetermined time.

Pump 47 and distributor 48 may be combined into a single unit forming a metering pump such as shown by FIGS. 16 and 17.

FIG. 16 shows a pump, with a piston 36 driven by the core 37 of a solenoid 38. In its risen position (on the right side of FIG. 16), piston 36 uncovers a slot through which liquid flows from tank 39. A non-return valve 40 is provided downstream of the metering pump.

FIG. 17 shows a peristaltic pump comprising a roller 41 rotating along a flexible portion 42 of the liquid feed tube, this flexible portion 42 resting against a shell 43, the roller 41 being carried on a rotary arm 44.

According to a preferred embodiment of the invention, the intermittent flow obtained with the above-described means is made proportional to the travel rate of the applicator. This is obtained by a linkage from the wheels of the applicator or of the tractor with the distributor 48 or the metering pump of FIGS. 15 and 16. In the first case, the solenoid valve 48 is energized through a sequential timer driven by the wheels of the applicator or of the tractor, or else the distributor 48 of FIGS. 18 and 19 is driven in the same fashion.

In the second case, the pump of FIGS. 16 or 17 will be driven by the wheels of the applicator or of the tractor.

What is claimed is:

1. A device for treating cultivated plants with liquids by contact moistening comprising:

a tubular container receiving said liquid, said container having a longitudinal axis, and a longitudinal slot on a lower surface thereof, said axis being horizontally disposed during use;

a plurality of soft, flexible flat wicks comprised of braids of woven fibers, and having ends tightly confined in a side-by-side relationship in said longitudinal slot, said wicks having a predetermined length to permit said wicks to spread over a substantial portion of said length over said plants;

spray nozzle means for spraying said liquid on said wicks, from said container, said spray nozzle means being disposed on said container closely adjacent to said end wicks contained in said longitudinal slot and remote from said wicks portion that spreads over said plants said nozzle means directed toward said portions of said wicks adjacent said slot; and pump means coupled to said nozzle means for pressurizing said fluid and supplying it to said nozzle means including means for providing an intermittent flow of said pressurized fluid in metered amounts to said nozzle means.

2. A device according to claim 1, in which flat wicks are formed of a doubled-over folded sheet, the free ends of which are confined inside the container while the folded-over loops extend outside of the container for resting upon the ground.

3. A device according to claims 1 and/or 2, in which the wicks are confined in liquid-tight manner across the container wall by means of a plastic overlay formed around said wicks during the moulding process for fabricating said container.

4. The device according to claim 2, in which the container (3) is in the shape of a tubular element formed of a plurality of tube sections with open ends provided with liquid-tight junction means for assembling said sections together.

5. A device according to claim 4, comprising inside said tubular element a rod (49) with threaded ends mating with internal threads of plugs (31, 32) placed over the ends of said tubular element for forming a liquid-tight assembly of several tube sections.

6. A device according to claim 1, in which the intermittent flow from the pump-and-distributor unit (47, 48) is proportional to the travel rate of said device.

7. A manual device according to claim 1, in which the container equipped with wicks is attached to a supporting member provided with prehension means such as handles.

8. A device according to claim 1, adapted for being pulled by a tractor or mounted on a tractor, comprising a plurality of elements (12, 13, 14) formed of containers (3) with wicks (1), said elements being mounted on a supporting frame (20), some of said elements (12) being fixed perpendicularly to the longitudinal centerline of said frame and some others (13, 14) being carried on either side of said centerline on swivelling arms (16) rotating about several axes of rotation against resilient return means (21) so that said elements (13, 14) may retract towards frame (20) when meeting an obstacle (15) through a combination of several mutually controlled swivelling motions for returning to their initial position after clearing an obstacle.

9. A device according to claim 7, in which one of the lateral elements (13, 14) is carried on a swivelling arm (16) rotating about an axis (17) near the end of said arm close to the centerline of frame (20), said axis (17) linking arm (16) with a connecting rod (18), the other end of which (19) is pivotally attached to the frame (20), the first end of said rod on said axis (17) being resiliently biased away from the frame (20) by resilient return means (21) a rope (24) being attached to the second end (19) of rod (18) at a point (26) close to said second end (19) of rod (18) for linking said rod with arm (16), the other end of said rope (24) being attached to the end (25) of arm (16) closer to the centerline of frame (20), said rope (24) passing along a pulley (27) mounted on said frame.

10. A device according to claims 8 and/or 9, in which the supporting structure (20) comprises at least one piece (34) resting upon the ground for maintaining an adjustable constant spacing of at least one container element from the ground.

11. A device according to claim 1, in which the container (3) carrying the wicks (1) is made of a translucent material allowing the liquid level to be visible from outside.

12. The device according to claim 1 wherein said nozzle means comprises a plurality of spray nozzles distributed along the length of said tubular container.

13. The device according to claim 12 wherein said intermittent means and said pump means are coupled to said container for supplying said intermittent, metered, pressurized liquid thereto and said nozzles are coupled to receive said liquid therefrom.

14. The device according to claim 12 wherein said nozzles are disposed for spraying said liquid onto an external part of said wicks.

15. The device according to claim 13 wherein said nozzles are disposed for spraying said liquid onto an external part of said wicks.

16. A device for treating cultivated plants with liquids by contact moistening adapted to be pulled by a tractor comprising:

a plurality of tubular containers having longitudinal axes, and longitudinal slots on lower surfaces thereof, said axes being horizontally disposed during use;

a plurality of soft, flexible flat wicks comprised of braids of woven fibers, and having ends tightly confined in a side-by-side relationship in said longitudinal slots, said wicks having a predetermined length to permit said wicks to spread over a substantial portion of said length over said plants;

spray nozzle means disposed on said containers for spraying said liquid on said wicks;

pump means coupled to said nozzle means for pressurizing said fluid and supplying it to said nozzle means; and intermitting means for providing an intermittent flow of said pressurized fluid in metered amounts to said nozzle means, said intermitting means further comprising a metering device;

said tubular containers being mounted on a supporting frame, a first group of said tubular containers being fixed perpendicularly to a longitudinal centerline of said frame and a second group of said tubular containers being carried on either side of said centerline on swivelling arms rotating about a plurality of axes of rotation against resilient return means so that said tubular containers may retract towards said frame when meeting an obstacle through a combination of several mutually controlled swivelling motions for returning to their initial position after clearing said obstacle.

* * * * *